July 12, 1960                S. P. DICKENS                2,944,960
ACETYLENE MAKING AND HEAVY OIL COKING PROCESS
Filed March 11, 1957
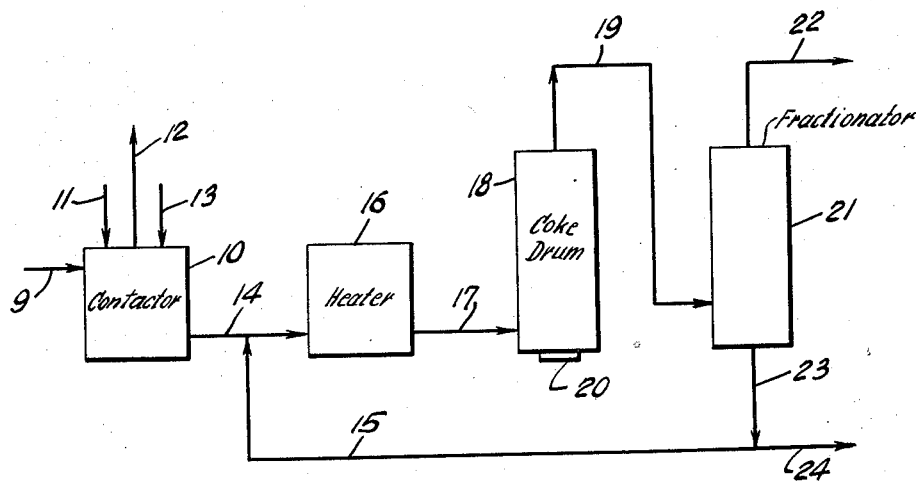

2,944,960

ACETYLENE MAKING AND HEAVY OIL COKING PROCESS

Samuel P. Dickens, Poughkeepsie, N.Y., assignor to Texaco Inc., a corporation of Delaware Filed Mar. 11, 1957, Ser. No. 645,062

6 Claims. (Cl. 208—85)

This invention relates to a process for generating acetylene by reacting calcium carbide with water, and more particularly to such process wherein the contacting is conducted in a medium of heavy hydrocarbon oil to provide, in addition to acetylene, a coking feed stock containing suspended lime. A further aspect of this invention is a unitary process for producing acetylene and petroleum coke containing occluded lime.

The uses of acetylene are widespread, for example in the welding and cutting of steel and in the production of rubber-like polymers, acrylonitrile, calcium cyanamide, etc. Petroleum coke containing occluded lime can be used, for example, in blast furnaces to provide fuel and flux and can, for example, after suitable conditioning to drive off volatile matter and to form the resulting carbon-quicklime product into suitable shapes, be used to make additional calcium carbide or a specialty slagging furnace fuel for admixture with other fuels.

Broadly, in a process for generating acetylene from calcium carbide and making hydrated lime as a by-product my improvement comprises contacting calcium carbide particles with water and a mobile reaction medium of oil coking charge stock. The charge stock is a heavy hydrocarbon oil such as a heavy or reduced crude, vacuum bottoms, residue from thermal cracking, hydrocarbon residua, or mixtures thereof. A suitable coking charge stock will have an initial boiling point of 600 to 1000° F. and preferably about 700 to 800° F., and API gravity of 0 to 20° and preferably about 8 to 15°, and a Conradson carbon residue of between 5 and 40 weight percent and preferably about 10 to 25% (ASTM Test D–180–52). The carbide sizes particularly useful in the practice of my process are the finer ones, e.g., ¼ by ½₂, Rice, and 14 ND.

Because of the presence of the oil vehicle in the hydration of the carbide the normally violent reaction, $$CaC_2 + 2H_2O \rightarrow Ca(OH)_2 + C_2H_2$$

is tempered for easy control. Preferably, the contacting is done by adding the carbide to a vigorously agitated mixture of water and oil, the oil-water mixture having the characteristics of a dispersion or emulsion of discrete water particles in the oil. The quantity of water need not be as high in proportion to the carbide used as is conventionally practiced in the so-called "wet process" because the heat generated is readily taken up as sensible heat in the oil medium. Temperature of the acetylene generation should not be substantially greater than 300° F. to suppress obnoxious by-products and acetylene polymerization, and the generation is advantageously conducted at a temperature from 100–200° F. to keep the oil highly mobile. I prefer to use a quantity of water in the water-oil mixture which is from about one to four times the stoichiometric amount necessary for completely decomposing the calcium carbide being added plus attendant water vapor losses from the reaction mixture, which losses can amount to about 2% to about 10% or more of the stoichiometric water used depending on the operating temperature and pressure.

The ratio of oil to water used can be broadly from about 1:1 to about 50:1 or more oil-to-water by weight; it is preferably from 2:1 to 10:1 oil-to-water for effectively tempering the reaction, dissipating heat, and providing the more useful kind of lime-oil slurry for subsequent coking operations. The resultant lime-oil slurry from the acetylene generating operation can be treated by settling, centrifuging, and/or filtration to separate oil vehicle or aqueous material for recycle to the carbide hydration operation. Alternatively, the entire slurry or a portion thereof can be fed into coking.

The oil coking charge stock usually is classified as a "dirty oil" and represents a disposal problem in many land locked refineries. It can be fractionated, however, into a "clean" and a "dirty" portion, and either or both parts used in my acetylene generating process and thereafter in a particular coking operation.

Thus my process can be carried in a pressure coking operation wherein both a "clean" and a "dirty" oil are recycled to the coke drum, or in a delayed coking operation where only the "dirty" oil is recycled to the coke drum. It can contain finely-divided carbon residue from previous cracking or distillation operations, which residue actually assists in emulsifying or stabilizing the water-oil mixture for the carbide treatment in my process. If desired one also can add to the oil a very minor amount, e.g., 0.1–1% based on the weight of the oil, of a cheap emulsifier such as tall oil soap, alkali metal sulfonates, and, sodium oleate, or a mixture of same, but these are not required. Foam, if encountered, can be controlled by addition of a defoaming agent such as dialkyl, diaryl, or alkyl-aryl silicone polymer, e.g., a dimethyl silicone polymer having viscosity of 100–1000 centistokes at 25° C. added to the mixture in concentration of 50–200 p.p.m. My process is not an impregnation of the carbide with the oil, but rather a direct contacting of the carbide with discrete water particles in a mobile reaction medium of the heavy hydrocarbon oil. Advantageously the water and oil are brought as an emulsion into the carbide contacting zone, but, of course, can be added as separate streams.

My acetylene generating step is advantageously integrated with a coking process as, for example, a fluid coking process or a coking process wherein coke accumulates in a static bed, e.g., delayed coking or pressure coke stilling (also called "coking plus thermal cracking").

A fluidized coking system such as the one described in U.S.P. 2,725,349 can be modified to inject coking charge stock containing hydrated lime from the acetylene generation into the oil feed inlet of the coking zone. Seeding need not be practiced in my operation, however, because the lime ordinarily furnished adequate coking nuclei. Advantageously, the turbulent fluidized bed of such coking zone is maintained at about 850–1000° F. so that no calcium hydroxide is converted into calcium oxide with the liberation of water which would increase greatly the vapor velocity in the coker. In the burner section of such fluidized coking system some or all of the calcium hydroxide can be converted into calcium oxide using temperatures above about 1100° F., if desired. The burning can be done with air, oxygen-enriched air, or substantially pure oxygen.

The drawing is a schematic diagram showing my unitary process of acetylene generating and petroleum coking wherein a delayed coking step is used. Condensers, coolers, pumps, reflux equipment and such auxiliary equipment is not shown, but will be installed in conventional fashion as is necessary or desired. Into emulsion contactor 10 one charges water through line 11 and coking oil, a heavy residual petroleum fraction optionally containing a minute amount of an emulsifier, through line 13. The water and oil are mixed and maintained in the intimate suspension by mechanical agitation while calcium carbide particles are fed through line 9. Wet raw acetylene gas is formed and discharged from the contactor through line 12 for purification and other handling in conventional manner. The operation can be made continuous by using a series of emulsion contactors, one discharging residue while another is on line generating acetylene. Alternatively, one can discharge emulsion from one contactor into another and so on successively to provide sufficient time of contact for utilizing substantially all the carbide. For simplicity, however, the contacting here is shown in a single vessel.

The liquid phase containing suspended hydrated lime (in the preferred embodiment of my invention this liquid phase being principally oil with very little, if any, free water) is withdrawn through line 14, mixed with a heavy clean gas oil recycle entering line 15, and the mixture passed through heater 16. Herein the mixture is heated to approximately 875–950° F., preferably 900–920° F., and discharged through line 17 into coking drum 18 wherein pressure of 5–50 p.s.i.g., preferably about 50 p.s.i.g. is maintained. Temperature of the coking drum is about 800–850° F. Hot coke still vapors are withdrawn from coking drum 18 through line 19 and passed into fractional distilling tower ("fractionator") 21. Fractionator 21 separates the coke still vapors into gas and liquid hydrocarbon distillates as overhead fractions (withdrawn through line 22 and lower points) and a heavy gas oil fraction withdrawn through line 23. Some heavy gas oil is sent through line 24 for cooling as product, and the balance is sent through line 15 for mixing with charge stock to heater 16. The ratio of recycled gas oil to fresh feed is between about 1 and about 1.6 bbls./bbl. This heavy gas oil is characterized by 20 to 25° API gravity, a carbon residue less than 0.05 weight percent and a 90% ASTM boiling point of 620° F. maximum.

Coke is permitted to build up in drum 18 for a period of 8 to 24 hours at the aforesaid temperature and pressure. At the end of this time the oily lime-containing feed and heavy gas oil can be switched to another coking drum, not shown. The accumulated coke and occluded lime in drum 18 is steamed at about 0 to 15 p.s.i.g. by admission of about 370° F. steam to drive off uncoked residual oil, which is also removed through line 19. The steamed coke containing calcium hydroxide is withdrawn through the base of the coke drum through manhole 20 in a conventional fashion.

The coke-lime can be calcined, if desired, to remove moisture and volatile matter, usually at a temperature of 1800–2400° F. or higher. Preferably the calcined product is fed into a conventional calcium carbide production operation using a conventional electric furnace, an induction furnace, or a shaft furnace. (Operation of the shaft furnace can be in accordance with the method shown in U.S. Patent 2,738,256 wherein an oxygen blast is injected annularly into the furnace near the base through a plurality of nozzles at a velocity of 40–100 meters per second and at an angle of between 10° and 30° to the horizontal.) Molten calcium carbide fluxed with some excess lime is withdrawn from the calcium carbide producer, and, after cooling and granulating, the carbide can be used as feed to emulsion contactor 10.

The following example shows one way in which my invention has been practiced but should not be construed as limiting the invention. All parts herein are parts by weight and all percentages are weight percentages unless otherwise indicated.

*Example*

A mixture of 74 parts of coking oil charge stock, a reduced crude hydrocarbon oil having API gravity of 24.2°, Conradson carbon residue content of 3.5%, and SUS viscosity at 100° F. of 459, and 26 parts of water was agitated to form an emulsion. The emulsion was dropped slowly on to 35.2 parts of granulated commercial calcium carbide maintained in an atmospheric pressure vessel. Acetylene was given off as a result of the contacting, and hydrated lime by-product was formed. Temperature of the operation was 90–100° F.

The hydrated lime-bearing oily mixture remaining at the end of an acetylene generation, conducted as outlined above, can be passed into a coking vessel wherein it is maintained at a back pressure of 125 p.s.i.g. and temperature of 850° F. for about 12 hours. At the end of this time the resulting coke is steamed to leave a residue of about 114 parts, this being a mixture of about 40 parts of carbon occluding about 74 parts of calcium hydroxide.

I claim:

1. In a process for generating acetylene from calcium carbide and making hydrated lime as a by-product, the improvement which comprises admixing calcium carbide particles with a separately formed dispersion of water particles in a mobile reaction medium of oil coking charge stock, the ratio of oil to water in said dispersion being within the range of from about 1 to 50 parts by weight of oil per part of water.

2. The process of claim 1 wherein the quantity of water used in forming said dispersion is within the range of one to four times the stoichiometric amount necessary for completely decomposing the calcium carbide plus attendant water vapor losses from the reaction mixture.

3. The process of claim 1 wherein said dispersion contains an emulsifier selected from the group consisting of tall oil soap, alkali metal sulfonate and sodium oleate, said emulsifier being present in an amount of from about 0.1 to about 1% by weight, based on the amount of oil in said dispersion.

4. A unitary process for producing acetylene and petroleum coke which comprises admixing, at a temperature from 100–230° F. in an agitated hydration zone, calcium carbide particles with a separately formed dispersion of water particles in a mobile reaction medium of oil coking charge stock, the ratio of oil to water in said dispersion being within the range of from about 1 to 50 parts by weight of oil per part of water, thereby forming a wet acetylene gas phase and a liquid phase containing suspended hydrated lime, separately withdrawing said gas phase and said liquid phase from said hydration zone, passing at least a portion of said liquid phase containing suspended lime into a coking zone maintained at temperature between about 850° and about 1500° F., thereby forming hydrocarbon distillate and petroleum coke containing occluded lime, and withdrawing from said coking zone said hydrocarbon distillate and said petroleum coke containing occluded lime.

5. The process of claim 4 wherein said coking zone comprises a body of coke particles maintained in the form of a dense turbulent fluidized bed at temperature 900–1100° F.

6. A process for generating acetylene and concurrently forming a mixture of oil and lime suitable as a coking charge, comprising forming an intimate supension of water and a heavy oil the ratio of oil to water in said suspension being within the range of from about 1 to 50 parts by weight of oil per part of water; bringing said suspension into contact with calcium carbide particles in a reaction zone to react said particles with said water and generate acetylene while forming an intimate mixture of calcium hydroxide with said oil; and separately recovering acetylene and said last named mixture from said reaction zone.

(References on following page)

References Cited in the file of this patent

UNITED STATES PATENTS

| | | |
|---|---|---|
| 648,688 | Green | May 1, 1900 |
| 1,183,457 | Herber | May 16, 1916 |
| 1,226,041 | White | May 15, 1917 |
| 1,516,813 | Ferguson | Nov. 25, 1924 |
| 2,222,585 | Riggs | Nov. 19, 1940 |
| 2,725,349 | Cahn et al. | Nov. 29, 1955 |
| 2,875,128 | Kirkpatrick et al. | Feb. 24, 1959 |

FOREIGN PATENTS

| | | |
|---|---|---|
| 18,110 | Great Britain | Nov. 12, 1898 |
| 27,252 | Great Britain | June 10, 1899 |
| 124 | Great Britain | Sept. 22, 1910 |